US009945257B2

(12) United States Patent
Fitzpatrick et al.

(10) Patent No.: US 9,945,257 B2
(45) Date of Patent: Apr. 17, 2018

(54) CERAMIC MATRIX COMPOSITE RING SHROUD RETENTION METHODS-CMC PIN-HEAD

(71) Applicant: General Electric Company, Schenectady, NY (US)

(72) Inventors: Dylan James Fitzpatrick, Peabody, MA (US); Christopher Paul Tura, Nahant, MA (US)

(73) Assignee: General Electric Company, Schenectady, NY (US)

( * ) Notice: Subject to any disclaimer, the term of this patent is extended or adjusted under 35 U.S.C. 154(b) by 63 days.

(21) Appl. No.: 14/858,508

(22) Filed: Sep. 18, 2015

(65) Prior Publication Data
US 2017/0081978 A1 Mar. 23, 2017

(51) Int. Cl.
F01D 25/24 (2006.01)
F01D 9/02 (2006.01)
(Continued)

(52) U.S. Cl.
CPC ............. F01D 25/246 (2013.01); F01D 9/02 (2013.01); F01D 11/08 (2013.01); F02C 3/04 (2013.01);
(Continued)

(58) Field of Classification Search
CPC ........ F01D 11/025; F01D 11/08; F01D 11/18; F01D 25/246; F01D 11/001;
(Continued)

(56) References Cited

U.S. PATENT DOCUMENTS 4,295,785 A 10/1981 Lardellier
4,953,282 A * 9/1990 Corsmeier ................ F01D 9/04
29/451
(Continued)

FOREIGN PATENT DOCUMENTS

EP 0017534 A1 10/1980
GB 2486964 A 7/2012
(Continued)

OTHER PUBLICATIONS

European Search Report and Opinion issued in connection with corresponding EP Application No. 16189266.6 dated Jan. 30, 2017.
(Continued)

Primary Examiner — Ehud Gartenberg
Assistant Examiner — Jason H Duger
(74) Attorney, Agent, or Firm — General Electric Company; William Scott Andes

(57) ABSTRACT

The present disclosure is directed to a retention assembly for a stationary gas turbine component. A first stationary gas turbine wall defines a first wall cavity and a second stationary gas turbine wall constructed from a ceramic matrix composite defines a second wall cavity. A pin shaft constructed from a first material includes a first shaft end and a second shaft end. A pin head constructed from the ceramic matrix composite includes a first pin head end and a second pin head end. The pin head defines a pin head cavity extending inward from the first pin head end. The first shaft end is positioned in the first wall cavity, and the second shaft end is positioned in the pin head cavity. The second pin head end is positioned in the second wall cavity. The first material is different from the ceramic matrix composite.

20 Claims, 5 Drawing Sheets

(51) Int. Cl.
*F02C 3/04* (2006.01)
*F01D 11/08* (2006.01)

(52) U.S. Cl.
CPC ...... *F05D 2220/32* (2013.01); *F05D 2230/60* (2013.01); *F05D 2260/30* (2013.01); *F05D 2300/6033* (2013.01); *Y02T 50/672* (2013.01)

(58) Field of Classification Search
CPC ......... F01D 11/005; F01D 25/28; B23H 9/10; F05D 2230/64; F05D 2240/11; F05D 2300/6033; F23R 3/002; F23R 3/007; F23R 3/60; F23R 2900/00017
See application file for complete search history.

(56) References Cited

U.S. PATENT DOCUMENTS

| | | | | |
|---|---|---|---|---|
| 5,188,507 A * | 2/1993 | Sweeney | ................ | B23H 9/10 415/170.1 |
| 5,593,276 A * | 1/1997 | Proctor | ................ | F01D 11/18 415/138 |
| 6,726,448 B2 * | 4/2004 | McGrath | ................ | F01D 11/12 415/135 |
| 6,733,235 B2 * | 5/2004 | Alford | ................ | F01D 11/08 415/173.1 |
| 7,434,670 B2 | 10/2008 | Good et al. | | |
| 7,874,059 B2 * | 1/2011 | Morrison | ................ | F16B 5/0266 29/446 |
| 7,967,562 B2 * | 6/2011 | Frost | ................ | F02K 1/80 29/525.02 |
| 8,191,224 B2 * | 6/2012 | Richards | ................ | F16B 35/045 29/509 |
| 8,985,944 B2 | 3/2015 | Shapiro et al. | | |
| 2003/0202876 A1 | 10/2003 | Jasklowski et al. | | |
| 2011/0236203 A1 | 9/2011 | Arilla et al. | | |
| 2016/0025345 A1 * | 1/2016 | Chandler | ................ | F23R 3/10 60/754 |
| 2016/0161121 A1 * | 6/2016 | Chang | ................ | C04B 35/80 60/753 |
| 2016/0177786 A1 * | 6/2016 | Sippel | ................ | F01D 25/24 416/189 |
| 2017/0044921 A1 * | 2/2017 | Vetters | ................ | F01D 9/04 |

FOREIGN PATENT DOCUMENTS

| | | |
|---|---|---|
| WO | 2010058137 A1 | 5/2010 |
| WO | WO 2013/181231 A1 | 12/2013 |

OTHER PUBLICATIONS

European Search Report and Opinion issued in connection with corresponding EP Application No. 16189270.8 dated Feb. 3, 2017.
GE Related Case Form.
European Search Report and Opinion issued in connection with corresponding EP Application No. 16189260.9 dated Feb. 21, 2017.
Notification of Reasons for Refusal issued in connection with related JP Application No. 2016-173234 dated Jul. 4, 2017.
First Office Action and Search issued in connection with related CN Application No. 201610823401.6 dated Aug. 30, 2017.
First Office Action and Search issued in connection with related CN Application No. 201610822742.1 dated Aug. 30, 2017.

* cited by examiner

CERAMIC MATRIX COMPOSITE RING SHROUD RETENTION METHODS-CMC PIN-HEAD

FIELD OF THE INVENTION

The present subject matter relates generally to a retention assembly for a gas turbine engine. More particularly, the present subject matter relates to a retention assembly for a stationary component in a gas turbine engine, such as a turbine shroud.

BACKGROUND OF THE INVENTION

A gas turbine engine generally includes, in serial flow order, a compressor section, a combustion section, a turbine section, and an exhaust section. In operation, air enters an inlet of the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the turbine section includes, in serial flow order, a high pressure (HP) turbine and a low pressure (LP) turbine. The HP and the LP turbines each include one or more turbine blades that extract kinetic energy and/or thermal energy from the combustion gases flowing therethrough. Each turbine blade typically includes a turbine shroud, which forms a ring or enclosure around the turbine blade. That is, each turbine shroud is positioned radially outward from and circumferentially encloses each corresponding turbine blade. In this respect, each turbine blade and each corresponding turbine shroud form a gap therebetween.

The components defining the hot gas path, such as the turbine shrouds, may be constructed a ceramic matrix composite material or another material capable of withstanding prolonged exposure to the hot combustion gases. The components positioned radially outward from the hot gas path, such as the turbine shroud mounts, typically experience lower temperatures than the components along the hot gas path. In this respect, these components may be constructed from suitable metallic materials.

Metallic pins are typically used in the gas turbine engine to couple components in gas turbine engines constructed from disparate materials (e.g., a ceramic matrix composite turbine shroud and a metallic turbine shroud mount). But, metallic pins exhibit poor wear characteristics when in contact with a disparate material, such as a ceramic matrix composite. This results in increased maintenance costs, which increases gas turbine operating costs. Furthermore, poor wear characteristics may lead to poor shroud positioning, which results in increased specific fuel consumption. Accordingly, a retention assembly for a stationary component of a gas turbine engine that provides improved wear characteristics would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a retention assembly for a stationary gas turbine component. A first stationary gas turbine wall defines a first wall cavity extending inward from a surface thereof and a second stationary gas turbine wall constructed from a ceramic matrix composite defines a second wall cavity extending inward from a surface thereof. A pin shaft constructed from a first material includes a first shaft end and a second shaft end. A pin head constructed from the ceramic matrix composite includes a first pin head end and a second pin head end. The pin head defines a pin head cavity extending inward from the first pin head end. The first shaft end is positioned in the first wall cavity, and the second shaft end is positioned in the pin head cavity. The second pin head end is positioned in the second wall cavity. The first material is different from the ceramic matrix composite.

Another aspect of the present disclosure is directed to a gas turbine. The gas turbine includes a compressor, a combustion section, and a turbine section. The turbine section includes a turbine shroud mount defining a turbine shroud mount cavity extending outward from a radially inner surface of the turbine shroud mount. The turbine section further includes a turbine shroud constructed from a ceramic matrix composite that defines a turbine shroud cavity extending radially inward from a radially outer surface of the turbine shroud. A pin shaft constructed from a first material includes a first shaft end and a second shaft end. A pin head constructed from the ceramic matrix composite includes a first pin head end and a second pin head end. The pin head defines a pin head cavity extending radially inward from the first pin head end. The first shaft end is positioned in the turbine shroud mount cavity, and the second shaft end is positioned in the pin head cavity. The second pin head end is positioned in the turbine shroud cavity. The first material is different from the ceramic matrix composite.

The present disclosure further includes a method for retaining a stationary component in a gas turbine. A turbine shroud mount cavity is formed in a turbine shroud mount. A turbine shroud cavity is formed in a turbine shroud constructed from a ceramic matrix composite. The ceramic matrix composite being different than the first material. A pin head is formed in a cavity in a first end of a pin head constructed from the ceramic matrix composite. A first end of a pin shaft is placed into the turbine shroud cavity. A second end of the pin shaft is placed into the pin head cavity. A second end of the pin head is placed into the turbine shroud cavity.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
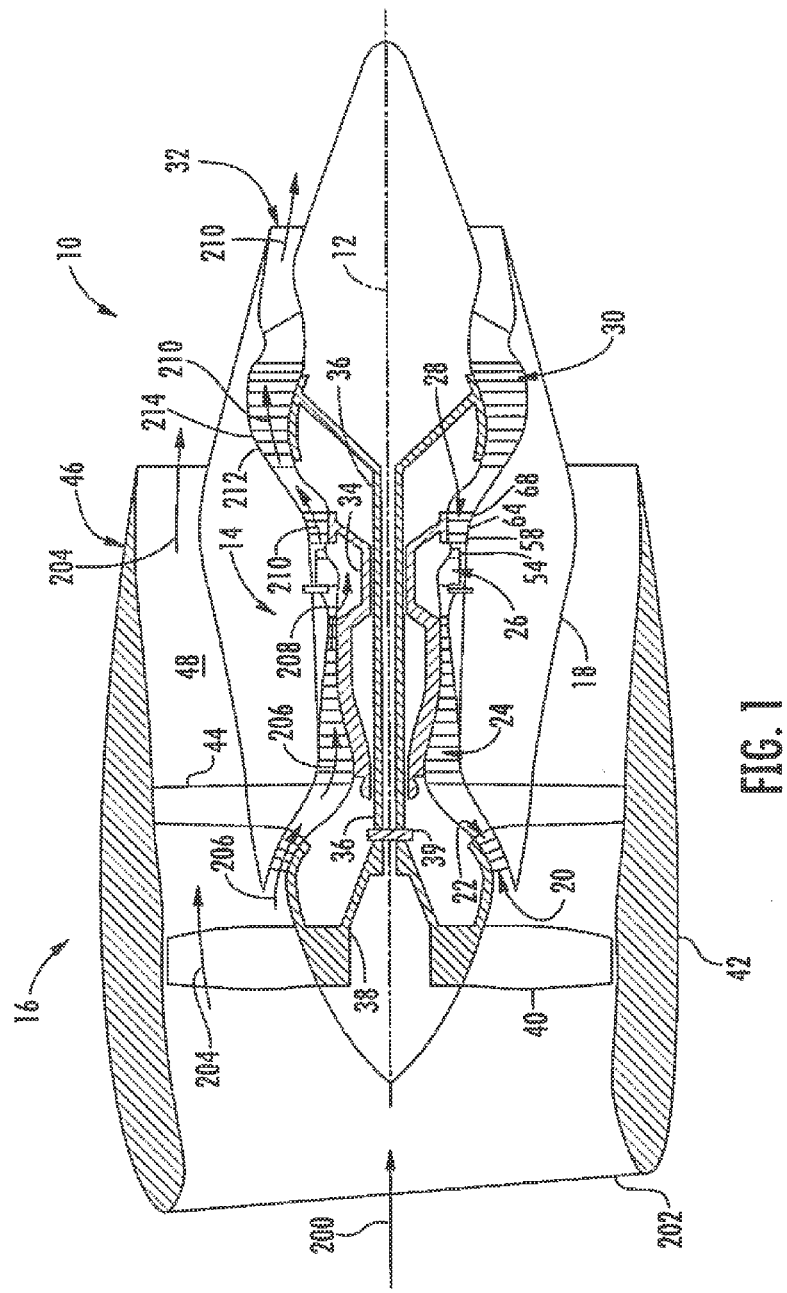
FIG. 1 is a schematic cross-sectional view of an exemplary high bypass turbofan jet engine in accordance with the embodiments disclosed herein.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative flow direction with respect to fluid flow in a fluid pathway. For example, "upstream" refers to the flow direction from which the fluid flows, and "downstream" refers to the flow direction to which the fluid flows.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a turbine shroud incorporated into a turbofan jet engine for purposes of illustration, one of ordinary skill in the art will readily appreciate that embodiments of the present invention may be applied to any turbine incorporated into any turbomachine and are not limited to a gas turbofan jet engine unless specifically recited in the claims.

Referring now to the drawings, wherein identical numerals indicate the same elements throughout the figures, FIG. 1 is a schematic cross-sectional view of an exemplary high bypass turbofan type gas turbine engine 10 herein referred to as "turbofan 10" and may incorporate various embodiments of the present invention. As shown in FIG. 1, the turbofan 10 has a longitudinal or axial centerline axis 12 extending therethrough for reference purposes. In general, the turbofan 10 may include a core turbine or gas turbine engine 14 disposed downstream from a fan section 16.

The gas turbine engine 14 may generally include a substantially tubular outer casing 18 that defines an annular inlet 20. The outer casing 18 may be formed from multiple casings. The outer casing 18 encases, in serial flow relationship, a compressor section having a booster or low pressure (LP) compressor 22 and a high pressure (HP) compressor 24, a combustion section 26, a turbine section having a high pressure (HP) turbine 28 and a low pressure (LP) turbine 30, and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The LP spool 36 may also connect to a fan spool or shaft 38 of the fan section 16. In particular embodiments, as shown in FIG. 1, the LP spool 36 may connect directly to the fan spool 38, such as in a direct-drive configuration. In alternative configurations, the LP spool 36 may connect to the fan spool 38 via a reduction gear 39, such as in an indirect-drive or geared-drive configuration.

As shown in FIG. 1, the fan section 16 includes a plurality of fan blades 40 coupled to and extending radially outwardly from the fan spool 38. An annular fan casing or nacelle 42 circumferentially surrounds the fan section 16 and/or at least a portion of the gas turbine engine 14. It should be appreciated by those of ordinary skill in the art that the nacelle 42 may be configured to be supported relative to the gas turbine engine 14 by a plurality of circumferentially-spaced outlet guide vanes 44. Moreover, a downstream section 46 of the nacelle 42 may extend over an outer portion of the gas turbine engine 14 to define a bypass airflow passage 48 therebetween.

Figure 2:
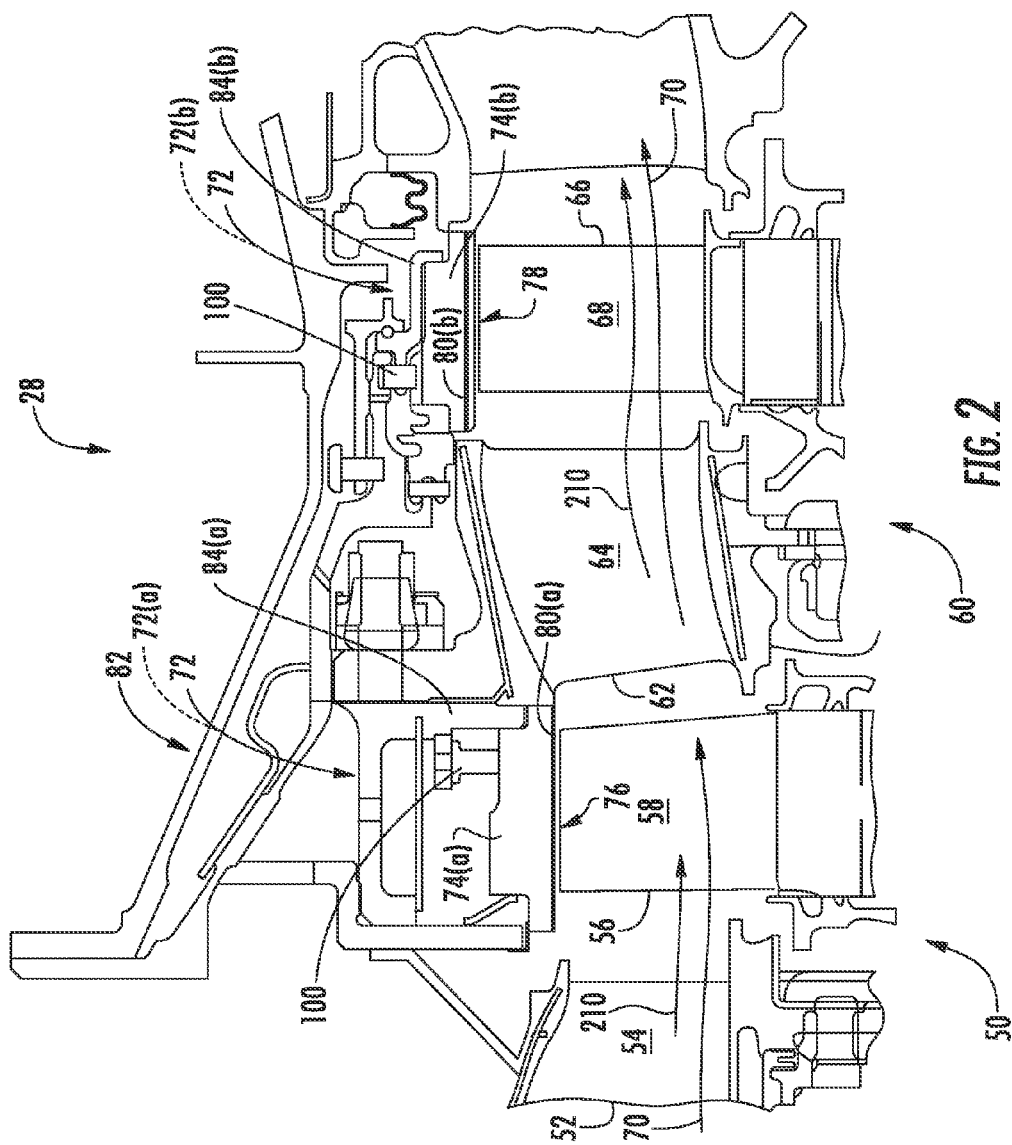
FIG. 2 is an enlarged cross sectional side view of a high pressure turbine portion of the gas turbine engine shown in FIG. 1, illustrating the location of a retention assembly in a high pressure (HP) turbine.

FIG. 2 is an enlarged cross-sectional view of the HP turbine 28 portion of the gas turbine engine 14 as shown in FIG. 1, which may incorporate various embodiments disclosed herein. As shown in FIG. 2, the HP turbine 28 includes, in serial flow relationship, a first stage 50 having a row 52 of one or more stator vanes 54 (only one shown) axially spaced apart from a row 56 of one or more turbine rotor blades 58 (only one shown). The HP turbine 28 further includes a second stage 60 having a row 62 of one or more stator vanes 64 (only one shown) axially spaced apart from a row 66 of one or more turbine rotor blades 68 (only one shown).

The turbine rotor blades 58, 68 extend radially outwardly from and are coupled to the HP spool 34 (FIG. 1). As shown in FIG. 2, the stator vanes 54, 64 and the turbine rotor blades 58, 68 at least partially define a hot gas path 70 for routing combustion gases from the combustion section 26 (FIG. 1) through the HP turbine 28. As shown in FIG. 1, the rows 52, 62 of the stator vanes 54, 64 are annularly arranged about the HP spool 34 and the rows 56, 66 of the turbine rotor blades 58, 68 are circumferentially spaced around the HP spool 34.

As shown in FIG. 2, various embodiments of the HP turbine 28 include at least one turbine shroud assembly 72. For example, the HP turbine 28 may include a first turbine shroud assembly 72(a) and a second turbine shroud assembly 72(b). Each turbine shroud assembly 72(a), 72(b) generally forms a ring or shroud around the corresponding row 56, 66 of turbine rotor blades 58, 68.

Each turbine shroud assembly 72(a), 72(b) may include a turbine shroud or shroud seal 74(a), 74(b) radially spaced from blade tips 76, 78 of the turbine rotor blades 58, 68. A retention assembly 100 connects each turbine shroud 74(a), 74(b) to a corresponding turbine shroud mount 84(a), 84(b). In particular, and as will be discussed in greater detail below, the retention assembly 100 axially and radially retains each turbine shroud 74(a), 74(b) relative to each turbine shroud assembly 72(a), 72(b). The turbine shroud mount 84(a), 84(b) may connect to a casing 82 of the turbofan 10.

This arrangement forms clearance gaps between the blade tips 76, 78 and sealing surfaces or hot side surfaces 80(a), 80(b). As mentioned above, it is generally desirable to minimize the clearance gap between the blade tips 76, 78 and the turbine shrouds 74(a), 74(b), particularly during cruise operation of the turbofan 10, to reduce leakage from the hot gas path 70 over the blade tips 76, 78 and through the clearance gaps. In particular embodiments, at least one of the turbine shrouds 74(a), 74(b) may be formed as a continuous, unitary, or seamless ring.

As illustrated in FIG. 1, air 200 enters an inlet portion 202 of the turbofan 10 during operation thereof. A first portion of the air 200 indicated by arrow 204 flows into the bypass flow passage 48, and a second portion of the air 200 indicated by arrow 206 enters the inlet 20 of the LP compressor 22. The LP compressor 22 progressively compresses the second portion of air 206 flowing therethrough en route to the HP compressor 24. The HP compressor 24 further compresses the second portion of the air 206 flowing therethrough 24, thus providing compressed air indicated by arrow 208 to the combustion section 26 where it mixes with fuel and burns to provide combustion gases indicated by arrow 210.

The combustion gases 210 flow through the HP turbine 28 where the stator vanes 54, 64 and turbine rotor blades 58, 68 extract a first portion of kinetic and/or thermal energy from the combustion gases 210. This energy extraction supports operation of the HP compressor 24. The combustion gases 210 then flow through the LP turbine 30 where sequential stages of LP turbine stator vanes 212 and LP turbine rotor blades 214 coupled to the LP shaft or spool 36 extract a second portion of thermal and/or kinetic energy from the combustion gases 210. This energy extraction causes the LP shaft or spool 36 to rotate, thereby supporting operation of the LP compressor 22 and/or rotation of the fan spool or shaft 38. The combustion gases 210 then flow through the jet exhaust nozzle section 32 of the gas turbine engine 14.

Along with a turbofan 10, a core turbine 14 serves a similar purpose and sees a similar environment in land-based gas turbines, turbojet engines in which the ratio of the first portion of air 204 to the second portion of air 206 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP spool 36 and the fan shaft 38 of the fan section 16.

Figure 3:
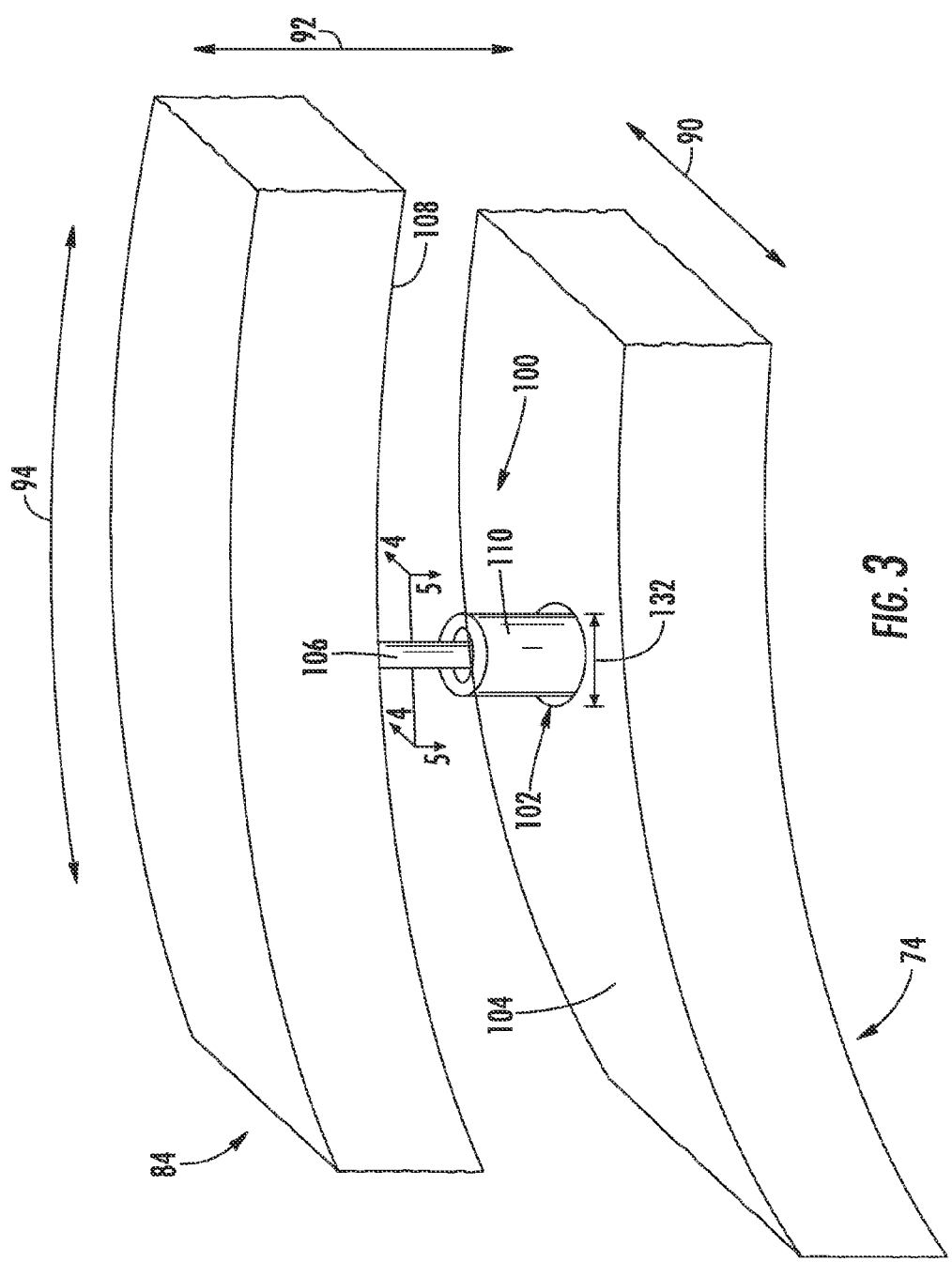
FIG. 3 is a perspective view of one embodiment of a retention assembly disclosed herein.
Figure 4:
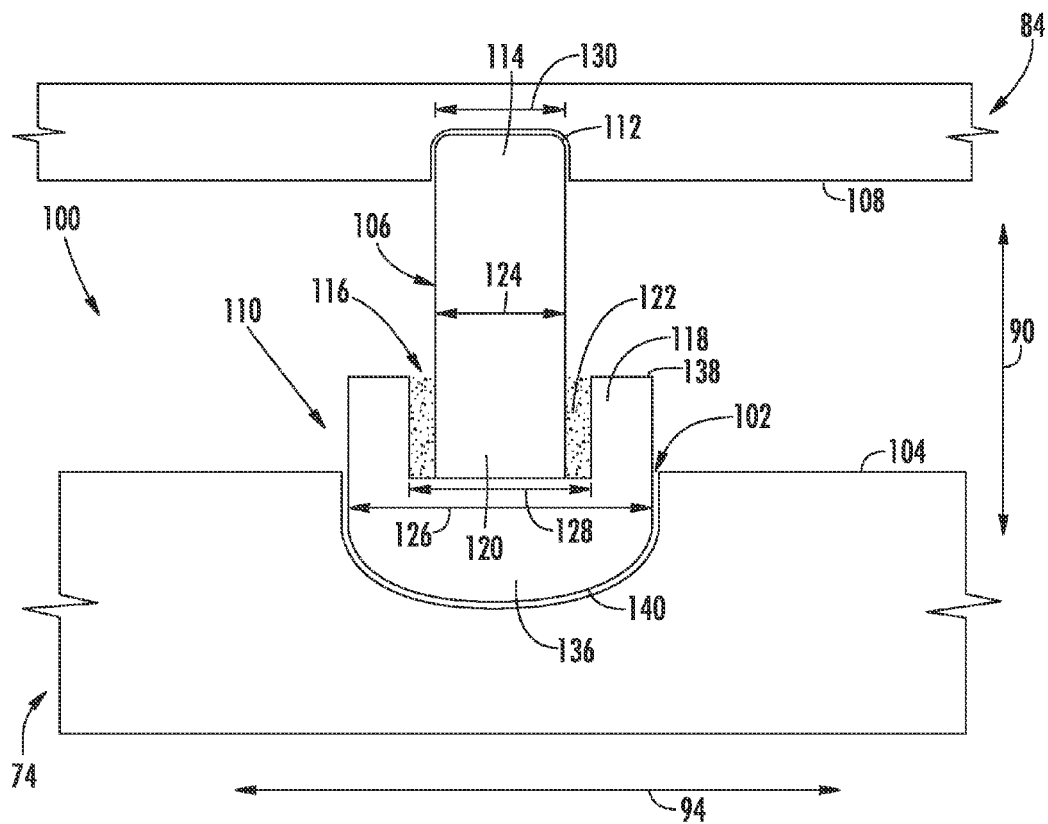
FIG. 4 is a cross-sectional view of the retention assembly taken generally about line 4-4, illustrating a second end of a pin shaft positioned in a pin head cavity in a pin head.
Figure 5:
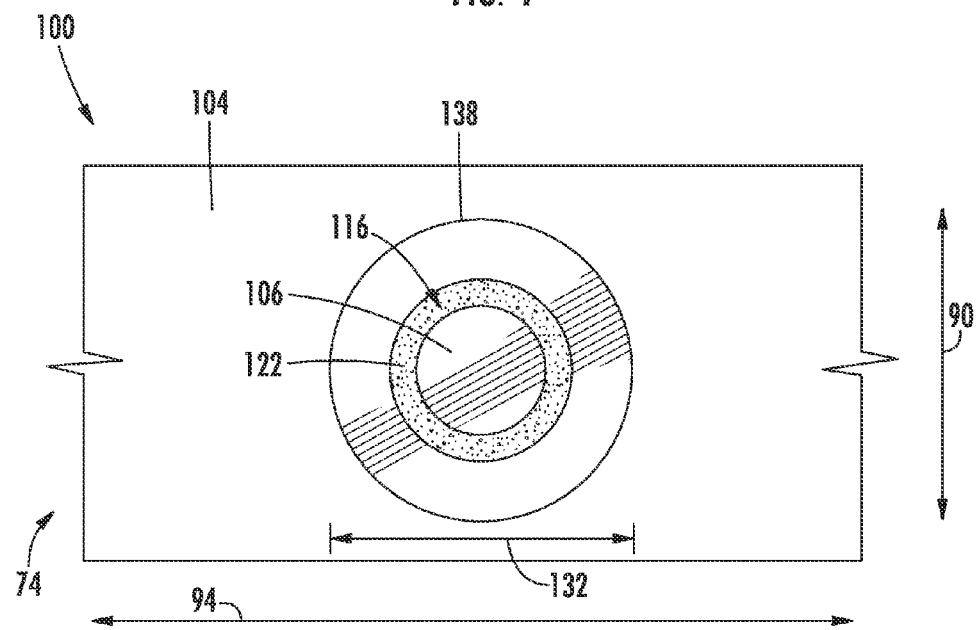
FIG. 5 is a further cross-sectional view of the retention assembly taken generally about line 5-5, illustrating the pin head positioned in a turbine shroud cavity.

FIGS. 3-5 illustrate the various components and features of the retention assembly 100. More specifically, FIG. 3 is a perspective view of one embodiment of the retention assembly 100 as disclosed herein. FIG. 4 is a cross-sectional view of the retention assembly 100, illustrating a second end of a pin shaft positioned in a pin head cavity in a pin head. FIG. 5 is further cross-sectional view of the retention assembly, illustrating the pin head positioned in a turbine shroud cavity.

As illustrated in FIGS. 3-5, the retention assembly 100 defines an axial direction identified by an arrow 90, a radial direction identified by an arrow 92, and a circumferential direction identified by an arrow 94. In general, the axial direction extends along the longitudinal axis 12, the radial direction extends orthogonally outward from the longitudinal axis 12, and the circumferential direction extends concentrically around the longitudinal axis 12.

The retention assembly 100 is positioned between a first gas turbine wall, such as a turbine shroud mount 84, and a second gas turbine wall, such as a turbine shroud 74. The turbine shroud mount 84 and the turbine shroud 74 may respectively be any of the turbine shroud mounts 84(a), 84(b), etc. or the turbine shrouds 74(a), 74(b), etc. in the turbofan 10. Although, the first and second gas turbine walls may be any other adjacent stationary components in the turbofan 10. The turbine shroud mount 84 includes a radially inner surface 108, and the turbine shroud 74 includes a radially outer surface 104.

The turbine shroud mount 84 defines a turbine shroud mount cavity 112 extending radially outward from the radially inner surface 108. The turbine shroud mount cavity 112 may extend all the way through the turbine shroud mount 84 (i.e., a through hole) or extend only partially through the turbine shroud mount 84 (i.e., a blind hole). The turbine shroud mount cavity 112 may have a circular cross-section. In this respect, the turbine shroud mount cavity 112 includes a turbine shroud mount cavity diameter indicated by arrow 130. Nevertheless, the turbine shroud mount cavity 112 may have any suitable non-circular cross-section (e.g., rectangular, pentagonal, etc.). In the case of a non-circular cross-section, the arrow 130 indicates the longest dimension of the turbine shroud mount cavity 112 cross-section (e.g., length, width, etc.). The turbine shroud mount 84 is preferably constructed from a metallic material; although, the turbine shroud mount 84 may be constructed from any suitable non-metallic material as well.

The turbine shroud 74 defines a turbine shroud cavity 102 extending radially inward from the radially outer wall 108. The turbine shroud cavity 102 preferably has a circular cross-section. In this respect, the turbine shroud cavity 102 includes a turbine shroud cavity diameter indicated by arrow 132. Nevertheless, the turbine shroud cavity 102 may have any other suitable cross-section (e.g., rectangular, pentagonal, etc.). In the case of a non-circular polygonal cross-sectional, the arrow 132 indicates the longest dimension of the turbine shroud cavity 102 cross-section (e.g., length, width, etc.). The turbine shroud 74 is preferably constructed from a ceramic matrix composite, but may be formed from any other suitable material.

The retention assembly 100 further includes the pin shaft 106 having a radially outer end 114 and a radially inner end 120. The pin shaft 106 is preferably solid; although, the pin shaft 106 may be hollow in some embodiments. The pin shaft 106 preferably has a circular cross-section. In this respect, the pin shaft 106 has an outer diameter indicated by arrow 124. The pin shaft 106 may have a substantially constant diameter or may have a diameter than varies along the radial direction. Nevertheless, the pin shaft 106 may have a suitable non-circular cross-section (e.g., rectangular, pentagonal, etc.). In this case, the arrow 124 indicates the longest dimension of the pin shaft 106 cross-section (e.g., length, width, etc.). The pin shaft 106 is preferably constructed from a metallic material, but may be constructed from suitable non-metallic materials as well. The pin shaft 106 may be constructed from the same material or a different material as the turbine shroud mount 84.

The retention assembly 100 includes a pin head 110 having a radially outer end 118 and a radially inner end 136. In this respect, the radially outer end 118 includes a radially outer surface 138, and the radially inner end 136 includes a radially inner surface 140. The pin head 110 defines a pin head cavity 116 extending radially inward from the radially outer surface 138 of the radially outer end 118. The radially inner end 136 is closed (i.e., does not define a cavity), and the radially inner surface 140 may be generally flat. Although, the radially inner surface 140 may be convex, concave, or otherwise curved. The pin head 110 and the pin head cavity 116 preferably have a circular cross-section. In this respect, the pin head 110 has an outer diameter indicated by arrow 126, and the pin head cavity 116 has a pin head cavity diameter indicated by arrow 128. Nevertheless, the pin head 110 and the pin head cavity 116 may have any suitable non-circular cross-section (e.g., rectangular, pentagonal, etc.). In this case, the arrows 124, 126 indicate the longest dimension of the pin head 110 and the pin head cavity 116 cross-section (e.g., length, width, etc.). The pin head 110 is preferably constructed from a ceramic matrix composite. Although, the pin head 110 may be constructed from any suitable material. Regardless, the pin head 110 may be constructed from the same material as the turbine shroud 74. Although, the pin head 110 may be formed from any suitable material that reduces the wear rate between the turbine shroud 74 and the pin head 110. Furthermore, the pin head 110 may be formed of a different material than the pin shaft 106.

When the retention assembly 100 is assembled, the turbine shroud mount cavity 112 receives the radially outer end 114 of the pin shaft 106. The pin shaft 106 may fit into the turbine shroud mount cavity 112 in a press-fit relationship. In this respect, the turbine shroud mount cavity 112 may generally have the same cross-sectional shape (e.g., circular, rectangular, etc.) as the pin shaft 106. Although, the turbine shroud mount cavity 112 and the pin shaft 106 may have different cross-sectional shapes as well. Furthermore, the turbine shroud mount cavity diameter may be approximately the same size as or smaller than the pin shaft diameter. Although, the turbine shroud mount cavity diameter may be larger than the pin shaft diameter to achieve a slip fit. For example, a weld (not shown), a wire (not shown), an additional pin head (not shown), or any other suitable fastener disposed on the radially outward side of the turbine shroud mount may couple the pin shaft 106 to the turbine shroud mount 84 should the turbine shroud mount cavity 112 extends completely through the turbine shroud mount 84.

The pin head cavity 116 receives the radially inner end 120 of the pin shaft 106. In the embodiment illustrated in FIGS. 3-5, the pin head cavity diameter is longer than pin shaft diameter. This clearance is necessary in embodiments of the retention assembly 100 because the pin shaft 106 and the pin shaft head 110 are constructed from disparate materials. In one embodiment, for example, the pin shaft 106 is a metallic material and the pin head 110 is a ceramic matrix composite material. Metallic materials typically have a greater coefficient of thermal expansion than the ceramic matrix composite materials. As such, the clearance permits the pin shaft 106 and the pin head cavity 110 to thermally expand at disparate rates. In some embodiments, a potting material 122 may be placed in the pin head cavity 116. In this respect, the potting material 122 is positioned between the pin shaft 106 and the pin head 110 to accommodate the disparate coefficients of thermal expansion. The potting material 122 also dampens the transmission of vibrations therebetween. The potting material 122 may be any suitable high-temperature ceramic adhesive, such as Resbond™ 940LE sold by Cotronics Corp. of Brooklyn, N.Y., USA or Ceramabond™ 618N or Ceramabond™ 890 sold by Aremco Products Inc. of Valley Cottage, N.Y., USA. Although, the potting material 122 may be any suitable material.

The turbine shroud cavity 102 receives the radially inner end 136 of the pin head 110. In one embodiment, the pin head cavity diameter is substantially the same size as the diameter of the turbine shroud cavity 102 to prevent axial and circumferential movement therebetween. That is, the sides of the turbine shroud cavity 102 prevent the pin head 110 from moving axially and circumferentially with respect to the turbine shroud 74. Although, the turbine shroud cavity diameter may be longer to permit relative movement therebetween or smaller to create a press fit. In one embodiment, the pin shaft 106 and pin head 110 may have an assembled radial length that prevents radial movement between the turbine shroud 74 and the turbine shroud mount 84.

The retention assembly 100 experiences reduced wear over the conventional retention devices such as metallic pins, thereby reducing maintenance and operating costs. More specifically, the pin head 110 may be constructed from the same material as the turbine shroud 74 (e.g., a ceramic matrix composite). In this respect, a contact between two ceramic matrix composite components or two components otherwise constructed from the same material results in reduced wear in comparison to the conventional metallic pin/ceramic material composite turbine shroud wear couplings. Reduced wear also reduces variation in shroud positioning, thereby improving the efficiency of the turbofan 10 and reducing specific fuel consumption thereby.

Figure 6:
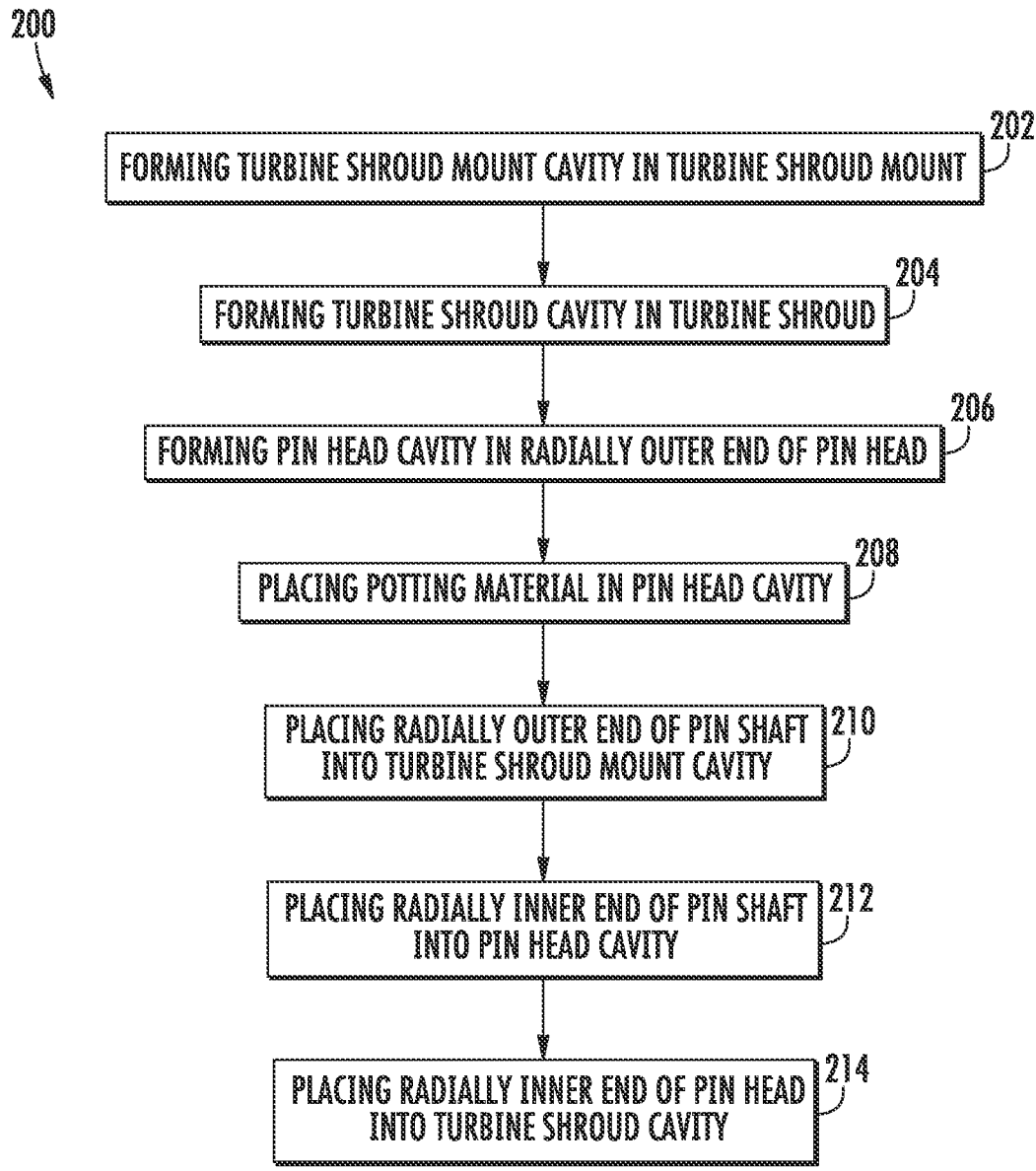
FIG. 6 is a flow chart is an exemplary method of retaining a stationary component, such as a turbine shroud, in the gas turbine.

FIG. 6 illustrates an exemplary method (200) for retaining a stationary component in turbofan 10, such as the turbine shroud 74. The method includes forming the turbine shroud mount cavity 112 in a turbine shroud mount 84 in step (202). Next, in step (204) the turbine shroud cavity 102 is formed in a turbine shroud 74. Then, the pin head cavity 116 is formed in the radial outer end 118 of the pin head 110 in step (206). In optional step (208), potting material 122 may be placed in the pin head cavity 116. The radially outer end 114 of a pin shaft 106 is placed in the turbine shroud mount cavity in step (210). Next, the radially inner end 120 of the pin shaft 106 is placed into the pin head cavity 116 in step (212). In step (214), the radially inner end of the pin head 110 into the turbine shroud cavity 102. Steps (202)-(206) may be performed in any order. Similarly, steps (210)-(214) may be performed in any order. Optional step (208) may be performed at any time after step (206) and before step (212).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A retention assembly for a stationary ceramic matrix composite gas turbine component, comprising:
   a first stationary gas turbine wall defining a first wall cavity extending inward from a first surface of the first stationary gas turbine wall, the first wall cavity extending from the first surface only partially through the first stationary gas turbine wall;
   a second stationary gas turbine wall constructed from a ceramic matrix composite and defining a second wall cavity extending inward from a second surface of the second stationary gas turbine wall, the second surface facing the first surface and the second wall cavity extending from the second surface only partially through the second stationary gas turbine wall;
   a pin shaft constructed from a first material and comprising a first shaft end and a second shaft end; and
   a pin head constructed from the ceramic matrix composite and comprising a first pin head end facing the first surface and a second pin head end, the pin head defining a pin head cavity extending from the first pin head end toward the second pin head end;

wherein the first shaft end is positioned in the first wall cavity, the second shaft end is positioned in the pin head cavity, the second pin head end is positioned in the second wall cavity, and the first material is different from the ceramic matrix composite.

2. The retention assembly of claim 1, wherein the first stationary gas turbine wall is a turbine shroud mount and the second stationary gas turbine wall is a turbine shroud, wherein the second wall cavity is concave, and wherein the second pin head end is convex.

3. The retention assembly of claim 1, wherein a length, a width, or a diameter of the pin head cavity is relatively longer than a respective length, width, or diameter of the second shaft end.

4. The retention assembly of claim 3, further comprising: a potting material positioned in the pin head cavity.

5. The retention assembly of claim 3, wherein the first material is a metallic material.

6. The retention assembly of claim 1, wherein the pin shaft and the pin head comprise an assembled radial length to substantially prevent radial movement between the first stationary gas turbine wall and the second stationary gas turbine wall.

7. The retention assembly of claim 1, wherein an outer surface of the first pin head end is flat.

8. The retention assembly of claim 1, wherein the second wall cavity has a substantially circular cross-section, and further wherein a diameter of the second wall cavity is substantially the same as a diameter of the pin head to substantially prevent axial and circumferential movement between the second stationary gas turbine wall and the pin head.

9. A gas turbine, comprising:
a compressor;
a combustion section; and
a turbine section, the turbine section comprising:
    a turbine shroud mount defining a turbine shroud mount cavity extending outward from a radially inner surface of the turbine shroud mount, the turbine shroud mount cavity extending from the radially inner surface only partially through the turbine shroud mount; and
    a turbine shroud constructed from a ceramic matrix composite and defining a turbine shroud cavity extending radially inward from a radially outer surface of the turbine shroud, the radially outer surface facing the radially inner surface and the turbine shroud cavity extending from the radially outer surface only partially through the turbine shroud;
    a pin shaft constructed from a first material and comprising a first shaft end and a second shaft end; and
    a pin head constructed from the ceramic matrix composite and comprising a first pin head end facing the radially inner surface and a second pin head end, the pin head defining a pin head cavity extending radially inward from the first pin head end toward the second pin head end;
    wherein the first shaft end is positioned in the turbine shroud mount cavity, the second shaft end is positioned in the pin head cavity, the second pin head end is positioned in the turbine shroud cavity, and the first material is different from the ceramic matrix composite.

10. The gas turbine of claim 9, wherein a length, a width, or a diameter of the pin head cavity is relatively longer than a respective length, width, or diameter of the second shaft end.

11. The gas turbine of claim 10, further comprising: a potting material positioned in the pin head cavity.

12. The gas turbine of claim 9, wherein an outer surface of the first pin head end is flat.

13. The gas turbine of claim 10, wherein the first material is a metallic material.

14. The gas turbine of claim 9, wherein the pin shaft and the pin head comprise an assembled radial length to substantially prevent radial movement between the turbine shroud mount and the turbine shroud.

15. The gas turbine of claim 9, wherein the turbine shroud cavity has a substantially circular cross-section.

16. The gas turbine of claim 9, wherein the turbine shroud cavity has a substantially circular cross-section, and further wherein a diameter of the turbine shroud cavity is substantially the same as a diameter of the pin head to substantially prevent axial movement between the turbine shroud and the pin head.

17. A method for retaining a stationary component in a gas turbine, the method comprising:
    forming a turbine shroud mount cavity in a turbine shroud mount, the turbine shroud mount cavity extending radially outward from a radially inner surface of the turbine shroud mount and only partially through the turbine shroud mount;
    forming a turbine shroud cavity in a turbine shroud constructed from a ceramic matrix composite, the turbine shroud cavity extending radially inward from a radially outer surface of the turbine shroud and only partially through the turbine shroud;
    forming a pin head cavity in a first pin head end of a pin head, the pin head constructed from the ceramic matrix composite and having a second pin head end, the pin head cavity extending radially inward from the first pin head end toward the second pin head end;
    placing a first end of a pin shaft into the turbine shroud mount cavity, the pin shaft constructed of a first material different from the ceramic matrix composite;
    placing a second end of the pin shaft into the pin head cavity of the pin head, the first pin head end facing the radially inner surface; and
    placing the second pin head end into the turbine shroud cavity, wherein the radially outer surface faces the radially inner surface.

18. The method of claim 17, wherein the pin head cavity is formed with a length, a width, or a diameter relatively longer than a respective length, width, or diameter of the pin shaft.

19. The method of claim 18, further comprising: placing a potting material in the pin head cavity prior to placing the second end of the pin shaft into the pin head cavity.

20. The method of claim 17, wherein the turbine shroud is formed with a length, a width, or a diameter substantially the same as a respective length, width, or diameter of the pin head.

* * * * *